F. M. BISHOP.
ADHESIVE FOR LENSES.
APPLICATION FILED JAN. 2, 1917.
1,386,046.
Patented Aug. 2, 1921.
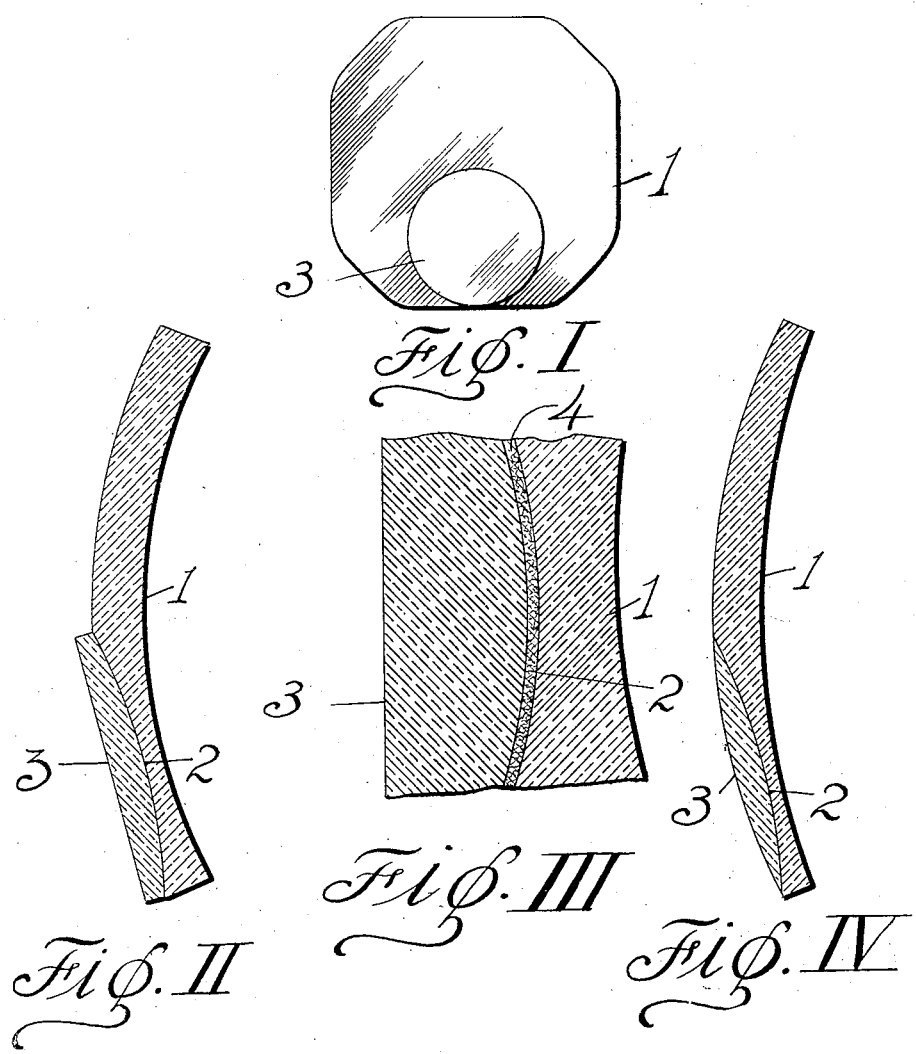

UNITED STATES PATENT OFFICE.

FRED M. BISHOP, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

ADHESIVE FOR LENSES.

1,386,046.                Specification of Letters Patent.      Patented Aug. 2, 1921.

Application filed January 2, 1917. Serial No. 140,107.

*To all whom it may concern:*

Be it known that I, FRED M. BISHOP, a citizen of the United States, residing at Southbridge, in the county of Worcester and State of Massachusetts, have invented certain new and useful Improvements in Adhesives for Lenses, of which the following is a specification.

My invention relates to improvements in ophthalmic lenses and has particular reference to that form of lenses composed of two or more parts.

One of the leading objects of my present invention is the provision of an improved adhesive which shall satisfactorily unite the different parts of the lens and shall securely retain said parts against either relative lateral movement or direct separation thereof.

A further object of my invention is the provision for use in a lens of this character, of an improved adhesive which shall be substantially transparent and in no wise interfere with the vision when employed in a thin film.

A further object of the invention is the provision of an adhesive possessing the retaining and transparent properties as mentioned above, which shall possess substantially the same coefficient of expansion and preferably about the same index of refraction as the surface on which it is to be employed, and which shall in any event embody extreme toughness to resist shocks, bending and breaking strain, whereby it may be employed as in joining glass surfaces liable to be subjected to sudden blows or fractures, and which will serve to satisfactorily retain the broken parts and prevent scattering or flying of the pieces under the force of the blow.

Other objects and advantages of my improved construction should be readily apparent by reference to the following specification, and it will be understood that I may make any modifications in the details of construction or the ingredients employed, or in the proportions of such ingredients and in the cement, within the scope of the appended claims without departing from or in any wise exceeding the spirit of my invention.

Figure I represents a plan view of one form of lens embodying my improvement.

Fig. II represents a sectional view through a blank embodying my improvement.

Fig. III represents an enlarged fragmentary view of the parts illustrated in Fig. II.

Fig. IV represents a view similar to Fig. II of the completed lens.

In the uniting of parts of an optical lens an extremely delicate situation is met with and one requiring a cement having peculiar and unusual properties. In the first place a lens being intended for use before as delicate and sensitive an organism as the eye, must be as nearly as possible optically perfect, must not cloud the vision, must not have undue dispersive refraction within the lens, but must be clearly transparent, while the lens itself is subjected to rather unusual strain on account of being worn by a person as from the cold outside into a warm room, or vice versa, being subject to frequent handling and rubbing, some times necessitating grinding or polishing of its surface after the parts are united, and for certain purposes being liable to blows which sometimes scatter the glass, in this event it being necessary to have a cement which will have sufficient tenacity to securely grip the several shattered fragments and have sufficient toughness or pliability to yield to the blow without itself being fractured so that it may hold the fragments and prevent their being driven into the eye of the wearer.

It has, therefore, been the purpose and aim of my present invention to take care of all of these several defects to be met with and to embody in a single cement ingredients which will enable that cement to comply with all of the foregoing difficult requirements and which will be in every respect suitable for use in uniting parts of a lens to be used before the eye.

In the formation of my cement I have found it desirable to employ one or more vegetable products, such as resin, gums or the like, having suitable adhesive properties, and in conjunction with these to employ a suitable compound for toughening the adhesive and an additional compound for increasing its transparency, frictionally resisting lateral shifting of the parts and to so combine the several elements that their coefficient of expansion will substantially correspond to that of the substance on which the cement is normally to be employed, that the refractive index of the cement will be very close to that of the substance in connection with which it is to be used, while the whole will possess the necessary toughness and adhesive property.

In the drawings, I have illustrated certain ophthalmic lenses constructed from two parts of glass to produce what is commonly known as a bifocal lens, which lens in the best known form comprises the major portion 1 having formed therein a countersink 2 adapted to receive a segment portion 3, my improved adhesive medium denoted as an entirety by the numeral 4, serving to substantially secure the segment within the countersink to securely retain it under all conditions, as has been previously outlined. It will thus be seen that in the use of my improvement I have provided an improved lens particularly adapted for ophthalmic purposes, in which the parts are firmly, securely but detachably united.

I have found that a very suitable compound may be made for the foregoing purposes in substantially the following proportions, although it will be understood that these proportions are capable of relatively wide variation according to the particular result, as transparency, frictional resistance, refractive index control or the like, which is desired to be the controlling feature of the cement, or adhesive.

One of my preferred adhesives for general use, however, is compounded of Canada balsam, two parts; shellac, one part; glass, five parts; and a suitable toughener, .02, among the preferred tougheners being phenol or an allied substance.

In this compound the shellac and balsam are the main adhesive agents, the relative proportion of the shellac and balsam being controlled as desired to control the melting or softening point at which the adhesive is most satisfactorily usable, the proportions of the phenol or toughener being varied according to the pliability desired in the adhesive when set, the greater the amount of toughener, the greater the pliability of the adhesive, while the amount of the powdered or crushed glass may be varied according to the importance placed upon the absolute transparency and correspondence of the cement to the refractive index of the substance on which it is to be employed and certain considerations as to lateral strength and the like.

I claim:

1. A cement comprising substantially two parts Canada balsam, one part shellac, five parts powdered glass and a small percentage of a phenolic toughening ingredient.

2. A cement comprising Canada balsam, shellac, powdered glass, and a small percentage of phenolic toughening ingredient.

In testimony whereof I affix my signature in the presence of this witness.

FRED M. BISHOP.

Witnesses:
H. H. STYTT,
E. M. HALVORSEN.